Patented May 9, 1944

2,348,594

UNITED STATES PATENT OFFICE 2,348,594

PRINTING INK

Dominic J. Bernardi, Bronx, N. Y., assignor to Interchemical Corporation, New York, N. Y., a corporation of Ohio No Drawing. Application November 14, 1942, Serial No. 465,633

4 Claims. (Cl. 106—29)

This invention relates to typographic printing inks useful in the printing of bread-wrappers, and aims to provide an inexpensive ink of this character characterized by its utility on all types of rollers, by its ability to be waxed immediately after printing, by its lack of harmful effect on the sealing characteristics of the finished bread-wrappers, and by its relatively slight odor.

In the manufacture of printed bread wrappers and the like, the finished prints must be waxed, used for packaging and then sealed. For years, the only inks used for this purpose were conventional linseed oil inks; while these dried slowly and had an undesirable odor, they were inexpensive, had little effect on the sealing of the finished packages, and were useful both with glue glycerine and rubber rollers.

The wax-set inks described in the Mock U. S. Patents 2,081,949 and 2,086,428 never came into extensive use for bread wrapper printing, in spite of their ability to be set by wax, and their relative lack of odor. One reason was expense; the second reason was the adverse effect these inks had on the sealing of the finished bread wrappers.

Water setting inks (see Gessler et al. Patent 2,157,385) have also been used in this field; while they cannot be used with glue glycerine rollers, do not print in highly humid weather as well as is sometimes desirable, and are somewhat expensive, they have to some extent replaced the linseed oil inks heretofore used, largely because of their lack of odor.

I have invented a typographic printing ink particularly adapted for bread-wrapper printing, characterized by low cost, excellent printability on all sorts of commercial rollers and under all sorts of humidity conditions, their inertness under hot wax, good odor and acceptable sealing. My inks comprise pigments dispersed in vehicles the non-volatile film-forming constituents of which consist essentially of from 25 to 60% of sulfonated fatty material, and from 75 to 40% of water-insoluble film-forming agents soluble in the sulfonated oil, a major portion of the non-sulfonated material being a resin soluble in the sulfonated oil, the balance being a viscosity-reducing material such as fatty acids.

The sulfonated oil may be any of the water-soluble sulfonated non-drying fatty oils available on the market, such as sulfonated castor oil, sulfonated coconut oil, sulfonated oleic acid, and the like. The resin may be chosen from the group soluble in these oils, whether natural or synthetic; because of low cost, rosin and its derivatives are preferred (e. g. ester gum, maleic acid treated rosin, etc.). Hydrogenated rosin gives the very best results for lack of odor. The viscosity reducer preferably consists of oil fatty acids. Talloil is a preferred source of the viscosity reducing acids, since some rosin is also present, and it is very cheap. Alternatively, a very slowly volatile solvent such as diethylene glycol may be used as the viscosity reducer.

If more than 60% of sulfonated oil is used in my ink, the prints are liable to attack by the water used in glossing the paraffin after printing and waxing; if less than 25% is used, the ink cannot be wax-set, and interferes with the sealing operation.

Typical examples of my invention are the following:

*Example 1—Varnish*

| | Parts by weight |
|---|---|
| Hydrogenated rosin | 30 |
| Talloil (viscosity reducer) | 35 |
| Ronople oil (sulfonated castor oil substantially free of water) | 35 |

The ingredients are melted together.

*Example 2—Varnish*

| | Parts by weight |
|---|---|
| Hydrogenated rosin | 30 |
| Talloil | 20 |
| Sulfonated castor oil (75% aqueous solution) | 50 |

The ingredients are melted together, and heated with stirring until the water evaporates.

*Example 3—Varnish*

| | Parts by weight |
|---|---|
| Rosin-maleic acid adduct | 30 |
| Ronople oil | 45 |
| Diethylene glycol | 25 |

This varnish shows how a glycol may be used as a viscosity reducer. In spite of the fact that the diethylene glycol is water-soluble, this ink is not affected by the water used in the wax-glossing process, whereas its total replacement by sulfonated oil would produce an ink so affected.

*Example 4—Light blue ink*

| | Parts by weight |
|---|---|
| Varnish of Example 1 | 54.5 | are milled with

| | |
|---|---|
| Titanium dioxide | 41.7 |
| Ultramarine blue pigment | 3.8 |

This ink prints nicely, is inert under wax, and gives an odorless film which is not affected by water, and which permits of good sealing.

Example 5—Yellow ink

|  | Parts by weight |
|---|---|
| Varnish of Example 1 | 69 | is milled with

|  |  |
|---|---|
| Chrome yellow | 31 |

The ink is similar to that of Example 4.

The above formulas merely illustrate my invention, and various substitutes may be made for the various ingredients without departing from the scope of the invention as defined by the claims.

I claim:

1. A typographic printing ink characterized by the production of films on paper which are inert and water-resistant under paraffin, and which do not substantially affect the sealing properties of the paraffin, comprising pigment dispersed in a vehicle, the non-volatile constituents of which consist essentially of from 25 to 60% of sulfonated fatty material, and from 75 to 40% of water-insoluble film-forming agent soluble in the fatty oil, a major proportion of the water-insoluble agent being a resin soluble in the sulfonated oil, the vehicle containing a viscosity-reducing agent to obtain typographic printing ink consistency.

2. A typographic printing ink characterized by the production of films on paper which are inert and water-resistant under paraffin, and which do not substantially affect the sealing properties of the paraffin, comprising pigment dispersed in a vehicle, the non-volatile constituents of which consist essentially of from 25 to 60% of sulfonated fatty material, and from 75 to 40% of water-insoluble film-forming agent soluble in the fatty oil, a major proportion of the water-insoluble agent being a resin soluble in the sulfonated oil, and a minor proportion being a viscosity reducing agent consisting essentially of oil fatty acids.

3. The composition of claim 2, in which the resin is hydrogenated rosin.

4. A typographic printing ink characterized by the production of films on paper which are inert and water-resistant under paraffin, and which do not substantially affect the sealing properties of the paraffin, comprising pigment dispersed in a vehicle, the non-volatile constituents of which consist essentially of from 25 to 60% of sulfonated fatty material, and from 75 to 40% of a mixture of a hydrogenated rosin and talloil in such proportion that the resin predominates in the mixture.

DOMINIC J. BERNARDI.